(12) United States Patent
Weiner et al.

(10) Patent No.: US 12,380,745 B2
(45) Date of Patent: Aug. 5, 2025

(54) METHOD FOR IDENTIFYING A MANIPULATION OF AN ANALOGUE SIGNAL BY MEANS OF A CONTROL DEVICE OF A VEHICLE, COMPUTER-READABLE MEDIUM, SYSTEM, AND VEHICLE

(71) Applicant: Bayerische Motoren Werke Aktiengesellschaft, Munich (DE)

(72) Inventors: Michael Weiner, Munich (DE); Peter Winklhofer, Munich (DE); Robert Meinlschmidt, Munich (DE); Theresa Reiner, Munich (DE); Markus Anton, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 134 days.

(21) Appl. No.: 18/553,991

(22) PCT Filed: Feb. 15, 2022

(86) PCT No.: PCT/EP2022/053557
§ 371 (c)(1),
(2) Date: Oct. 4, 2023

(87) PCT Pub. No.: WO2022/238022
PCT Pub. Date: Nov. 17, 2022

(65) Prior Publication Data
US 2024/0185647 A1    Jun. 6, 2024

(30) Foreign Application Priority Data

May 11, 2021    (DE) .................... 10 2021 112 330.5

(51) Int. Cl.
*H04L 12/40*    (2006.01)
*G07C 5/04*    (2006.01)

(52) U.S. Cl.
CPC .......... *G07C 5/04* (2013.01); *H04L 12/40032* (2013.01); *H04L 2012/40215* (2013.01); *H04L 2012/40273* (2013.01)

(58) Field of Classification Search
CPC ................ G07C 5/04; H04L 12/40032; H04L 2012/40215; H04L 2012/40273
See application file for complete search history.

(56) References Cited

U.S. PATENT DOCUMENTS

2020/0294401 A1    9/2020    Kerecsen

FOREIGN PATENT DOCUMENTS

| DE | 10308396 A1 | 9/2004 |
| DE | 102013222789 A1 | 5/2015 |

(Continued)

OTHER PUBLICATIONS

International Search Report corresponding to International Patent Application No. PCT/EP2022/053557, dated Jun. 9, 2022 (5 pages).

(Continued)

*Primary Examiner* — Mathew Franklin Gordon
(74) *Attorney, Agent, or Firm* — Maginot, Moore & Beck LLP

(57) ABSTRACT

A method identifies a manipulation of an analog signal by means of a control device of a vehicle. A series of messages are received from a bus system using the control device of the vehicle, wherein a message of the sequence of messages includes a value of the analog signal. The method includes storing the sequence of messages in a buffer of the control device, and determining a temporal profile of the analog signal based on the stored sequence of messages. The method further includes calculating a gradient for the determined temporal profile of the analog signal, and plausibility-checking the calculated gradient to identify the manipulation (Continued)

of the analog signal. The method also includes providing an alarm message if the gradient is not plausible.

17 Claims, 2 Drawing Sheets

(56) References Cited

FOREIGN PATENT DOCUMENTS

| | | |
|---|---|---|
| DE | 102018218902 A1 | 5/2020 |
| WO | 2019229034 A1 | 12/2019 |

OTHER PUBLICATIONS

Written Opinion corresponding to International Patent Application No. PCT/EP2022/053557, dated Jun. 9, 2022 (6 pages).
German Search Report corresponding to German Patent Application No. 10 2021 112 330.5, dated Jan. 19, 2022. (7 pages).

METHOD FOR IDENTIFYING A MANIPULATION OF AN ANALOGUE SIGNAL BY MEANS OF A CONTROL DEVICE OF A VEHICLE, COMPUTER-READABLE MEDIUM, SYSTEM, AND VEHICLE

The present application is the U.S. national phase of PCT Application PCT/EP2022/053557 filed on Feb. 15, 2022, which claims priority of German patent application No. 102021112330.5 filed on May 11, 2021, which is incorporated herein by reference in its entirety.

TECHNICAL FIELD

The present disclosure relates to identifying a manipulation of an analog signal by means of a control device of a vehicle.

BACKGROUND

Control devices of vehicles are communicatively connected to one another via bus systems. A control device of the bus system can receive and process messages of the bus system. A control device commonly receives analog content via the bus system. The analog content items are not currently subjected to testing by the receiving control device.

It would therefore be desirable to efficiently identify a manipulation of an analog signal by means of a control device of a vehicle. It would furthermore be desirable to efficiently identify a manipulation of analog content of a message from a bus system by means of a control device of a vehicle.

SUMMARY

The above-stated objects are achieved by advantageous embodiments and developments described herein.

A first aspect is characterized by a method for identifying a manipulation of an analog signal by means of a control device of a vehicle. The method can be a computer-implemented method and/or a control-device-implemented method. The analog signal can be analog content of a message from a bus system of a vehicle. Preferably, the analog signal is transmitted digitally via the bus system of the vehicle. The control device is preferably a recipient of the analog signal. The vehicle can be a motor vehicle. The method comprises receiving a sequence of messages from a bus system by means of the control device of the vehicle, wherein one message of the sequence of messages comprises a value of the analog signal. The sequence of messages comprises at least two messages. Preferably, the sequence of messages comprises more than two messages. The bus system can be a CAN bus.

The method comprises storing the sequence of messages in a buffer memory of the control device. The buffer memory can be a volatile or non-volatile memory of the control device of the vehicle. The buffer memory can store at least two messages from the sequence of messages, namely a current message and a message preceding the current message. In addition or alternatively, the buffer memory can store a predetermined number of messages from the sequence of messages. In addition, or alternatively, the buffer memory can store messages from the sequence of messages for a specified time interval.

The method comprises determining a temporal profile of the analog signal based on the stored sequence of messages. The method further comprises calculating a gradient for the determined temporal profile of the analog signal and plausibility checking the calculated gradient to identify the manipulation of the analog signal. The plausibility checking of the calculated gradient can comprise checking the gradient with regard to a predetermined value range, and/or a predetermined set of values, and/or a predetermined temporal profile. Finally, the method comprises issuing an alarm message from the control device to a vehicle-external server if the gradient, in particular the calculated gradient, is not plausible. For example, the calculated gradient may not be plausible if a maximum possible value is exceeded and/or if the gradient deviates from a predetermined typical gradient.

Advantageously, the method can identify manipulation of an analog signal or an analog content of a message efficiently by submitting the gradient of the analog signal to a plausibility check. Thus, a control device as the recipient of a message can efficiently identify a manipulation of a message or a sequence of messages and transmit the manipulation to a vehicle-external server. Manipulation of analog signals of a vehicle can thus be identified quickly.

According to an advantageous embodiment, the sequence of messages may comprise at least two messages.

According to a further, advantageous embodiment, the plausibility-checking of the calculated gradient to identify the manipulation of the analog signal can comprise determining a permissible value range of the gradient of the analog signal, and plausibility checking the calculated gradient with regard to the permissible value range determined. This allows manipulation of an analog signal to be efficiently identified.

According to a further, advantageous embodiment, the permissible value range can be specified in advance. For example, the permissible value range can be defined by one or more physical variables.

According to another advantageous embodiment, the permissible value range can be learned by the control device. This allows the permissible value range to be determined dynamically.

According to yet another advantageous embodiment, the permissible value range can be calculated and/or learned using one or more vehicle-specific, physical parameters. This allows the permissible value range to be determined efficiently.

According to a further, advantageous embodiment, the analog signal may comprise a distance traveled, an acceleration, a deceleration, a speed, a torque, an engine speed, a charging current, and/or a discharge current.

A further aspect is characterized by a computer-readable medium for identifying a manipulation of an analog signal by means of a control device of a vehicle, wherein the computer-readable medium comprises instructions that, when executed on a computer or a control device, carry out the method described above.

A further aspect is characterized by a system for identifying a manipulation of an analog signal by means of a control device of a vehicle, the system being designed to carry out the method described above.

A further aspect is characterized by a vehicle comprising the system described above for identifying a manipulation of an analog signal by means of a control device of a vehicle.

Additional features arise from the claims, the FIGS. and the description of the figures. All the features and feature combinations cited in the description above, and the features and feature combinations cited in the description of the figures below and/or shown in the figures alone are applicable not only in the respective combination indicated, but also in other combinations or else in isolation.

In the following, a preferred exemplary embodiment is described by reference to the attached drawings. This will reveal further details, preferred embodiments and extensions of the disclosure.

DETAILED DESCRIPTION

Figure 1:
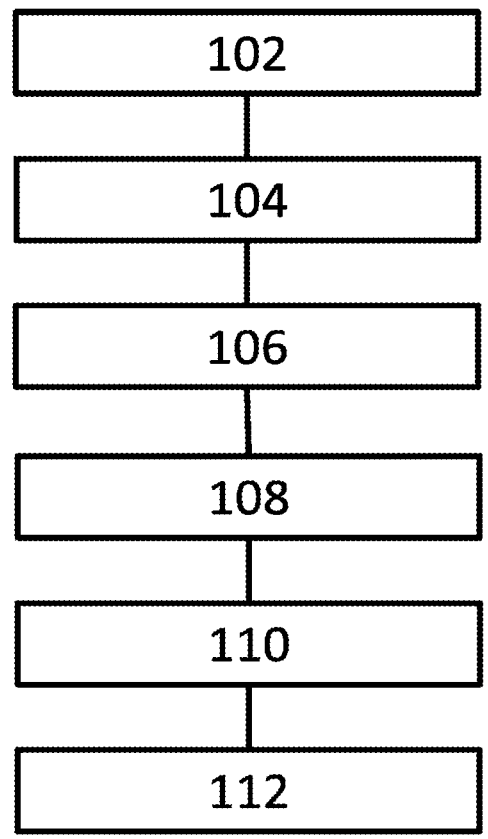
FIG. 1 shows an exemplary method for identifying a manipulation of an analog signal by means of a control device of a vehicle.

In detail, FIG. 1 shows a method 100 for identifying a manipulation of an analog signal by means of a control device of a vehicle. The method 100 is preferably carried out on the control device as the recipient of the analog signal. The method 100 of a sequence of messages of a bus system is received 102 by the control device of the vehicle, wherein one message of the sequence of messages comprises a value of the analog signal. The method can store 104 the sequence of messages in a buffer memory of the control device. Further, the method 100 can determine 106 a temporal profile of the analog signal based on the stored sequence of messages, and calculate 108 a gradient for the determined temporal profile of the analog signal. The method 100 can plausibility check 110 the calculated gradient to identify the manipulation of the analog signal, and issue 112 an alarm message from the control device to a vehicle-external server if the gradient is not plausible.

The plausibility checking 110 of the calculated gradient can be performed with respect to a typical gradient and/or a typical value range of the gradient. The typical profile of the gradient and/or the typical value range can be specified in advance. For example, the typical profile of the gradient and/or the typical value range of the gradient can be specified during a configuration of the control device. In addition or alternatively, the typical profile of the gradient and/or the typical value range of the gradient can be determined dynamically. For example, the typical profile of the gradient and/or the typical value range can be learned by means of a learning method. For the learning, known learning methods can be used, which are trained, for example, during testing of the vehicle and are able to plausibility-check the calculated gradient with respect to the typical profile and/or the typical value range of the gradient.

For example, the analog signal may be a speed signal of the vehicle. The speed signal of the vehicle can only increase by a specified maximum value as a function of the maximum torque of the vehicle per unit time. The method can check the plausibility of the gradient of the speed signal with respect to the specified maximum value of the speed signal increase. If the increase in the speed signal exceeds the specified or learned maximum value, the method 100 can identify a manipulation of the speed signal and send an alarm message to the vehicle-external server.

Advantageously, the method 100 can check the plausibility of the message or the sequence of the messages independently of the sender of the message. Thus, even manipulated analog contents or analog signals of messages from control devices, which are additionally added to the bus system, can be efficiently identified by the control device as the recipient of the messages.

Figure 2:
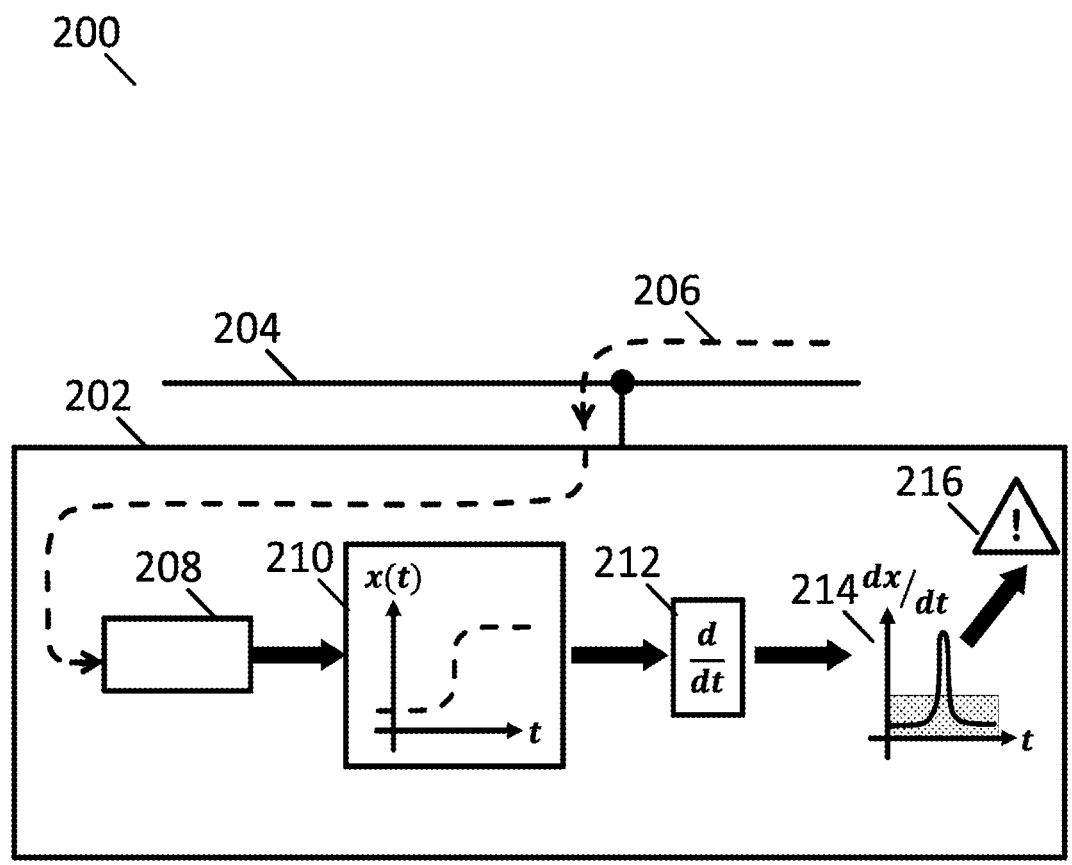
FIG. 2 shows an exemplary system for identifying a manipulation of an analog signal by means of a control device of a vehicle.

In detail, FIG. 2 shows an exemplary system 200 for identifying a manipulation of an analog signal by means of a control device of a vehicle. A control device 202 can be communicatively connected to a bus system 204. The control device 202 can receive a sequence of messages 206 via the bus system 204. The sequence of messages can be cached in a memory 208. The control device 202 can read the sequence of messages from the memory 208 and determine a temporal profile 210 of the values of an analog signal from the sequence of messages. Furthermore, the control device 202 can calculate a gradient 212 for the determined temporal profile of the analog signal. Furthermore, the control device can determine a temporal profile 214 of the gradient and plausibility check the temporal profile of the gradient. If the gradient is not plausible, the control device issues an alarm message 216 to a vehicle-external server.

Advantageously, the method or the system can plausibility check analog contents of a sequence of messages efficiently, so that manipulation of an analog content of a message can be identified. Due to technical and/or physical restrictions, analog contents of messages from a bus system can only change by a certain amount per unit time. By plausibility checking the gradient of the analog content of the sequence of messages, it is possible to verify whether the change in the analog content is within permissible limits or exceeds the permissible limits. Exceeding the permitted limits may indicate that manipulation of the analog content of a message has occurred. By transmitting an alarm message to a vehicle-external server, manipulation of the messages can be quickly identified.

LIST OF REFERENCE SIGNS 100 method
102 receiving a sequence of messages
104 storing the sequence of messages
106 determining a temporal profile
108 calculating a gradient
110 plausibility checking the gradient
112 issuing an alarm message
200 system
202 control device
204 bus system
206 sequence of messages
208 memory
210 temporal profile of an analog signal
212 calculation of the gradient
214 temporal profile of the gradient
216 alarm message

The invention claimed is:

1. A method for identifying a manipulation of an analog signal by means of a control device of a vehicle, said method comprising:
   receiving a series of messages from a bus system using the control device of the vehicle, wherein a message of the sequence of messages comprises a value of the analog signal;
   storing the sequence of messages in a buffer of the control device;
   determining a temporal profile of the analog signal based on the stored sequence of messages;
   calculating a gradient for the determined temporal profile of the analog signal;
   plausibility-checking the calculated gradient to identify the manipulation of the analog signal; and providing an alarm message from the control device to a server external to the vehicle if the gradient is not plausible.

2. The method as claimed in claim 1, wherein the sequence of messages comprises at least two messages.

3. The method as claimed in claim 2, wherein plausibility-checking the calculated gradient to identify the manipulation of the analog signal comprises:

obtaining a permissible value range for the gradient of the analog signal; and plausibility-checking the calculated gradient with regard to the permissible value range.

4. The method as claimed in claim 3, wherein the permissible value range is predetermined.

5. The method as claimed in claim 3, wherein the permissible value range is learned by the control device.

6. The method as claimed in claim 3, further comprising using the control device to determine the permissible value range dynamically.

7. The method as claimed in claim 6, wherein the permissible value range is determined using one or more vehicle-specific, physical parameters.

8. The method as claimed in claim 3, wherein the permissible value range is calculated and/or learned using one or more vehicle-specific, physical parameters.

9. The method as claimed in claim 8, wherein the analog signal may comprise at least one of the group consisting of a distance traveled, an acceleration, a deceleration, a speed, a torque, an engine speed, a charging current, and/or a discharge current.

10. The method as claimed in claim 3, wherein the analog signal may comprise at least one of the group consisting of a distance traveled, an acceleration, a deceleration, a speed, a torque, an engine speed, a charging current, and/or a discharge current.

11. The method as claimed in claim 1, wherein the analog signal may comprise at least one of the group consisting of a distance traveled, an acceleration, a deceleration, a speed, a torque, an engine speed, a charging current, and/or a discharge current.

12. The method as claimed in claim 11, wherein plausibility-checking the calculated gradient further comprises determining a temporal profile of the determined gradient.

13. The method as claimed in claim 7, wherein plausibility-checking the calculated gradient further comprises determining a temporal profile of the determined gradient.

14. The method as claimed in claim 1, wherein plausibility-checking the calculated gradient further comprises determining a temporal profile of the determined gradient.

15. A computer-readable medium for identifying a manipulation of an analog signal by means of a control device of a vehicle, said computer-readable medium comprising instructions that, when executed on a computer or a control device, carry out the method as claimed in claim 1.

16. A system for identifying a manipulation of an analog signal by means of a control device of a vehicle, said system being designed to carry out the method as claimed in any of claim 1.

17. A vehicle comprising the system for identifying a manipulation of an analog signal by means of a control device of a vehicle as claimed in claim 16.

* * * * *